J. HABBART.
GRAIN AND HAY STACKER.
APPLICATION FILED MAY 28, 1919.
1,346,020.
Patented July 6, 1920.
4 SHEETS—SHEET 1.
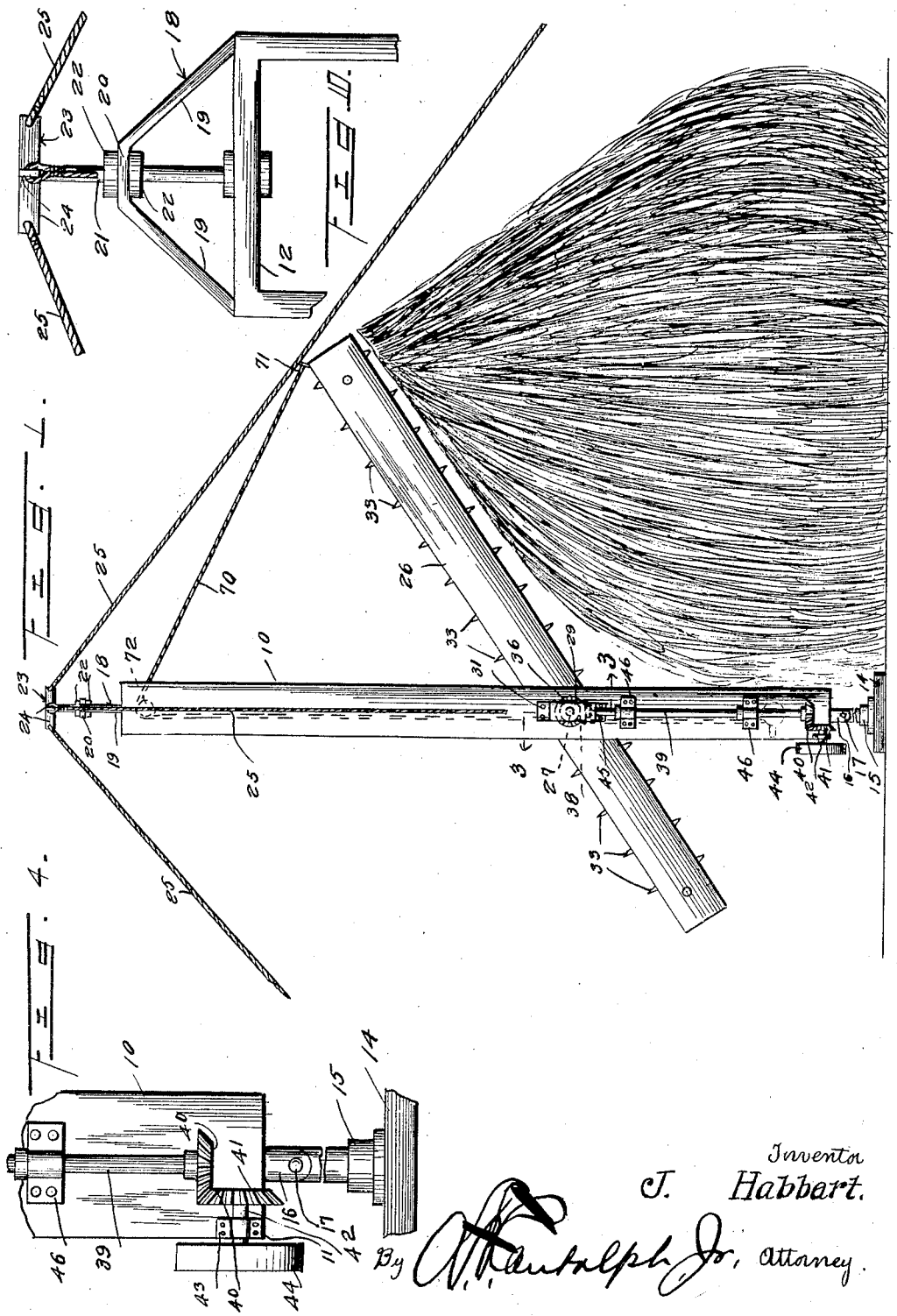
Inventor
J. Habbart.
By A. Randolph Jr., Attorney.

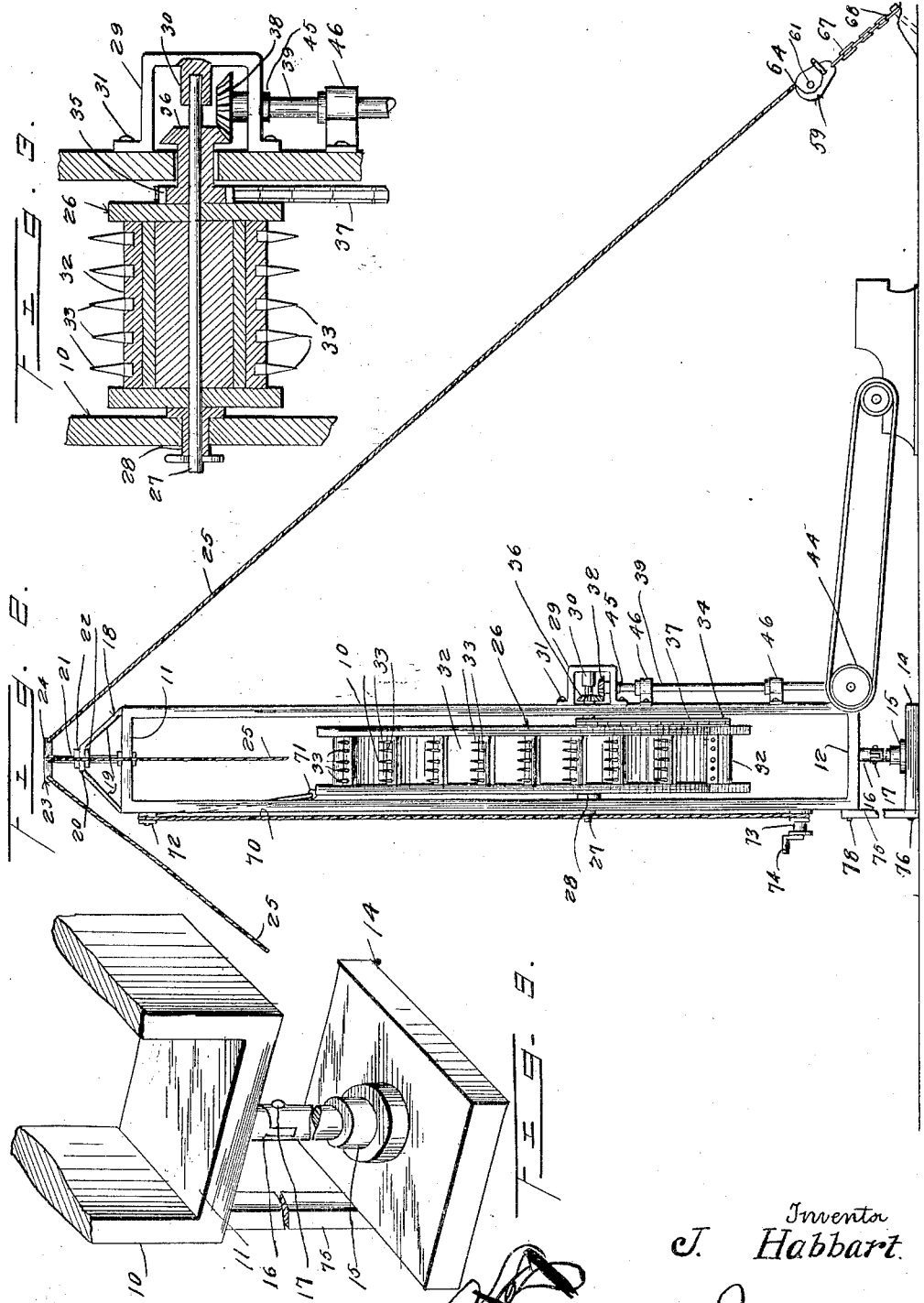

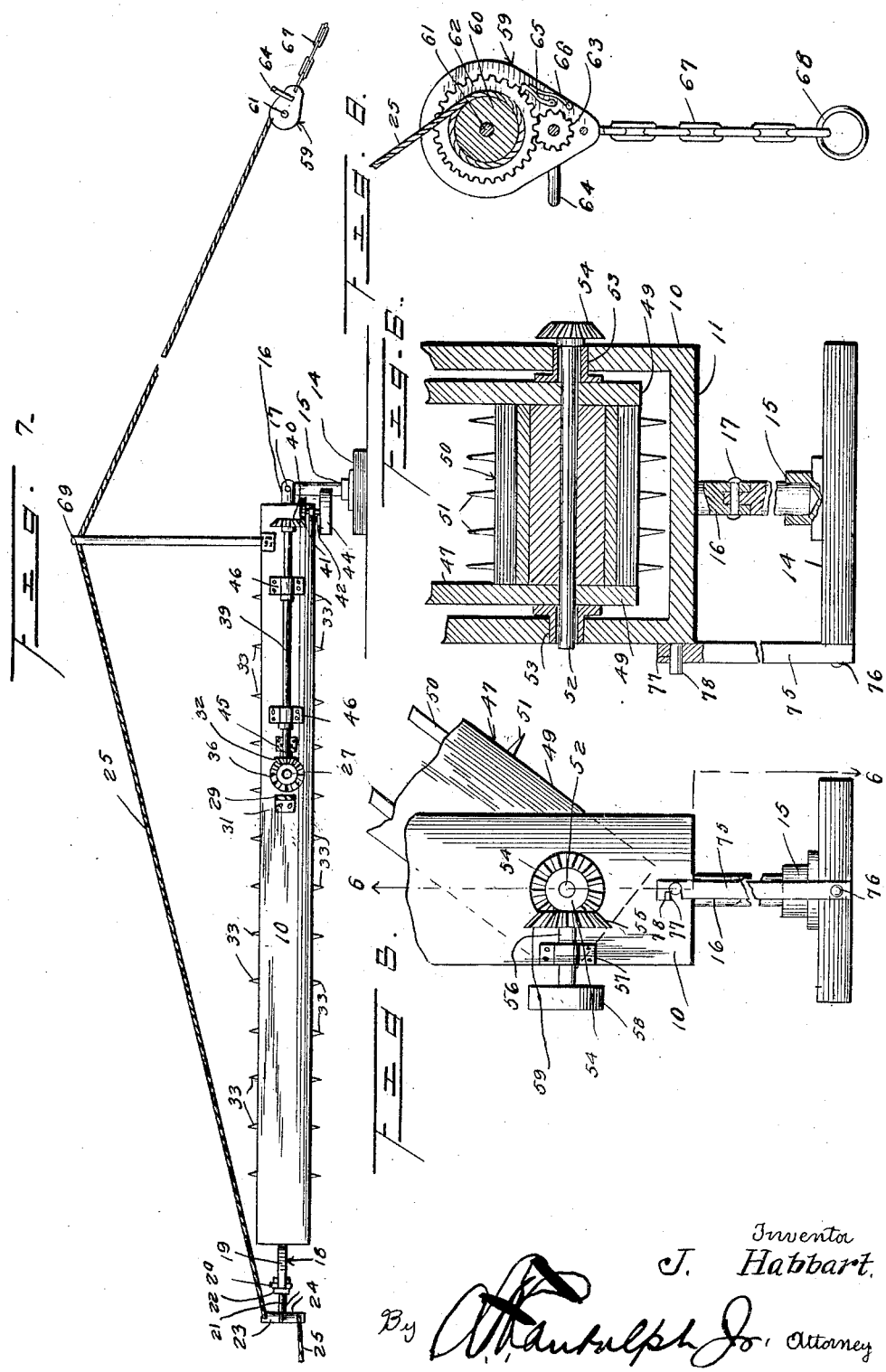

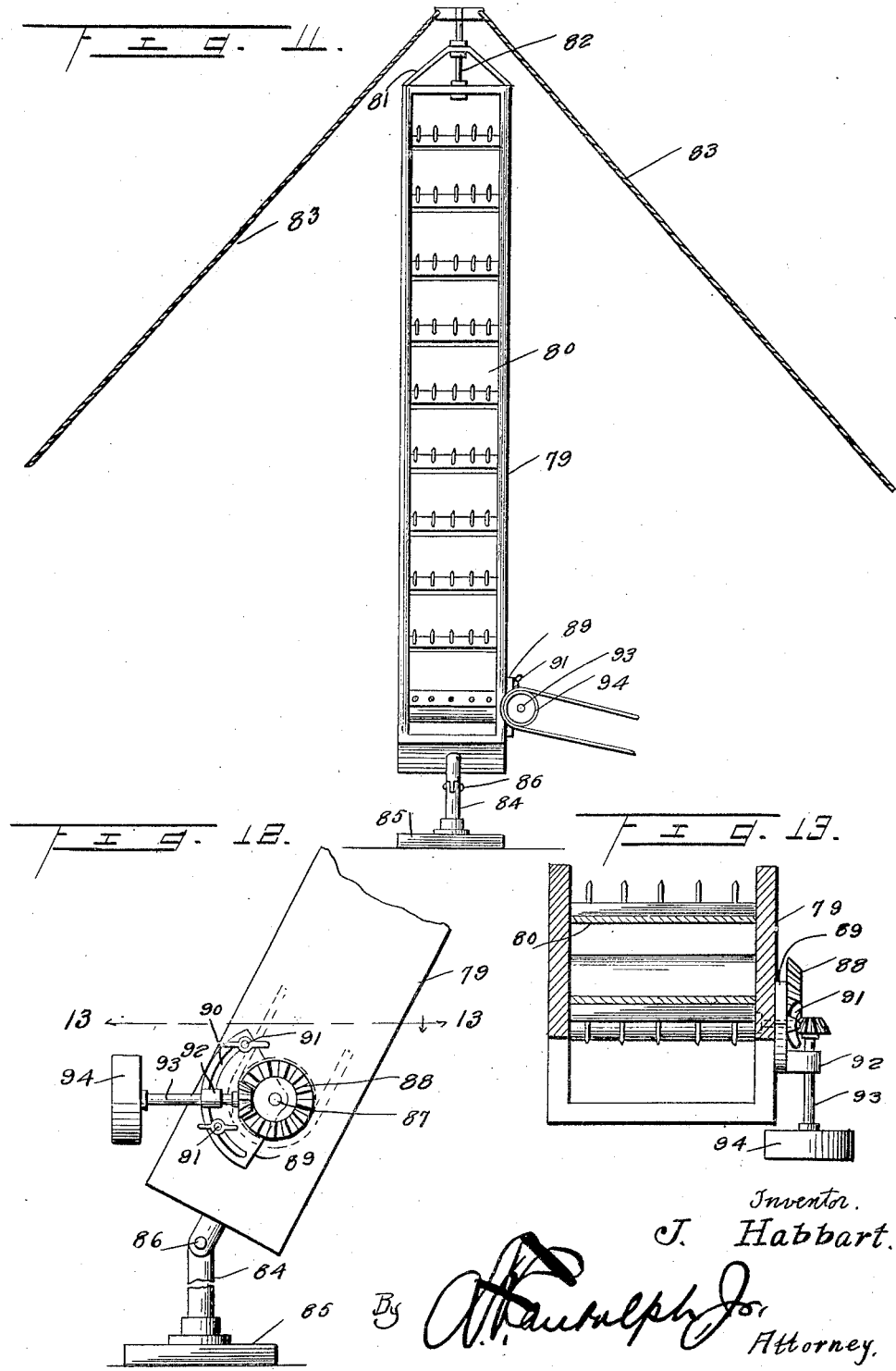

UNITED STATES PATENT OFFICE.

JOHN HABBART, OF PRAIRIE DU CHIEN, WISCONSIN.

GRAIN AND HAY STACKER.

1,346,020.   Specification of Letters Patent.   Patented July 6, 1920.

Application filed May 28, 1919. Serial No. 300,276.

*To all whom it may concern:*

Be it known that I, JOHN HABBART, a citizen of the United States, residing at Prairie du Chien, in the county of Crawford and State of Wisconsin, have invented certain new and useful Improvements in Grain and Hay Stackers; and I do hereby declare the following to be a full, clear, and exact description of the invention, such as will enable others skilled in the art to which it appertains to make and use the same.

My invention relates to improvements in grain and hay handling means and more particularly to grain and hay stackers adapted for piling hay and grain.

An important object of this invention is to provide a stacker for grain and hay adapted for handling the grain or hay in a highly convenient and expeditious manner thereby reducing to a minimum the expense and labor incident to stacking grain and hay.

A further object of this invention is to provide novel supporting and operating means for the conveyer forming a part of the apparatus.

A further object of this invention is to provide a stacker of the character described which may be easily and conveniently set up and taken down.

A further object of this invention is to provide a stacker which is reliable, rigid in construction, and comparatively cheap to manufacture.

Other objects and advantages of the invention will be apparent during the course of the following description.

In the accompanying drawings forming a part of this specification and in which like numerals are employed to designate like parts throughout the same, Figure 1 is a side elevation of a stacker embodied in my invention, Fig. 2 is a front elevation of the same, Fig. 3 is an enlarged section taken on line 3—3 of Fig. 1, Fig. 4 is an enlarged fragmentary elevation of the frame for supporting the conveyer showing the power transmitting means for the conveyer, Fig. 5 is a fragmentary side elevation of a slightly modified form of the invention, Fig. 6 is an enlarged section taken on line 6—6 of Fig. 5, Fig. 7 is a fragmentary side elevation illustrating the means for raising and lowering the stacker, Fig. 8 is a section through a block and tackle device embodied in the invention, Fig. 9 is a fragmentary perspective of a portion of the stacker showing the means for supporting the frame therefor, Fig. 10 is a fragmentary elevation of the upper portion of the supporting frame, Fig. 11 is a front elevation of a further modification of the invention, Fig. 12 is a fragmentary side elevation of the stacker shown in Fig. 11, and, Fig. 13 is a horizontal section taken on line 13—13 of Fig. 12.

In the drawings wherein for the purpose of illustration is shown the preferred embodiment of my invention, the numeral 10 designates a frame composed principally of vertical parallel side bars, and upper and lower cross bars 11 and 12 respectively. The frame 10 is mounted on a suitable base 14. A socket or bearing 15 is mounted on the base and receives a bearing pin 16 carried by the bottom 11. The pin is rotatably mounted in the bearing socket 15 and is hinged intermediate its ends as at 17 to permit of the raising and lowering of the frame.

As illustrated in Fig. 10, the frame in each form of the invention is provided with a tapering head 18. The tapering head 18 is provided with inclined sides 19 connected by a cross piece 20. A pin 21 extends through the cross piece 20 and is provided with a cap 22. The upper end of the pin 21 is provided with a head 23 having a plurality of arms 24. The outer ends of the arms are apertured for the reception of the ends of cables 25. As clearly shown in the several figures, the cables 25 extend outwardly and connect with fastening means to be more fully hereinafter described. By reason of the frame being rotatable with relation to the pin 21, the same may be turned for a quarter of a turn prior to taking it down.

In the form of my invention illustrated in Figs. 1 to 4 inclusive a conveyer structure 26 is carried by the frame and is pivoted intermediate its ends thereof. As illustrated in Fig. 3, a shaft 27 supports the conveyer 26 and has its ends mounted in bearings 28 and 29. The bearing 28 is of the usual sleeve type, while the bearing 29 is of an approximately U-shaped structure and is provided with a bearing opening 30. The arms of the U-shaped bearing member 29 are secured to the frame by suitable retaining means 31. The conveyer 26 includes a suitable traveling element 32 which may be provided with tines 33. The traveling element 32 is operated by a gear 34 having connection with the lower shaft of the conveyer. A sprocket wheel 35 is formed integral with a gear 36, and connects with the gear 34 by a sprocket chain 37. The gear 36 is disposed exteriorly of the frame and has connection with a bevel gear 38. The bevel gear 38 is mounted upon and keyed to a vertical shaft 9. As clearly illustrated in Fig. 4, the shaft 39 is provided with a lower bevel gear 40. The bevel gear 40 meshes with a second bevel gear 41 carried by a shaft 42. The shaft 42 is mounted on a bearing 43 carried by the side of the frame. An operating wheel 44 is keyed to the shaft 42 and is adapted for connection with a source of power. The upper end of the shaft 39 extends through a suitable bearing opening 45 of the element 29 and the lower end portion of the shaft extends through a bearing 46 carried by the frame. Attention is called to the fact that the wheel 44 is arranged on the opposite side of the frame from the hay.

In the forms of my invention illustrated in Figs. 5 and 6, the frame has a conveyer structure 47 pivotally connected to the lower end thereof. As clearly illustrated in Fig. 6, the conveyer structure 47 includes vertical sides 49 and a conveyer belt or other traveling element 50. The traveling element 50 may be provided with tines 51. A supporting shaft 52 serves to permit of the pivotal movement of the conveyer structure 47. Sleeve bearings 53 receive the end portions of the shaft 52 and are secured to the sides 49 of the conveyer structure. The sleeves 53 serve to pivotally support the conveyer structure without strain on the shaft 52. One end portion of the shaft 52 carries a gear 54 meshing with a second gear 55. The gear 55 is connected to a shaft 56 carried by a bearing 57 secured to the side of the main frame.

A wheel 58 is keyed to the shaft 56 and is adapted for connection with a suitable source of power.

The outer ends of the cables 25 are connected to block tackles 59. The block tackles include drums 60 mounted on shafts 61. Coacting gears 62 and 63 are carried by the tackle structure. A crank handle 64 is connected to the gear 63. A pawl 65 is adapted to engage the wheel 62 and is held in an operative position by a spring 66. Chains 67 have connection to the block tackles and are adapted to be arranged or secured about posts 68. In raising and lowering the frame, a pole 69 may be provided to support the intermediate portions of the cable and prevent horizontal pull on the same. As clearly shown in Fig. 7, the pole is arranged adjacent one end of the frame and upon winding the cable secured to one of the blocks, the conveyer structure may be elevated. In lowering the conveyer, the same process may be followed. Brackets 69' carried by opposite sides of the frame support the pole. The pole is constructed of two upright members having their upper ends connected.

In the operation of my improved stacker, a load of hay is brought to a point adjacent the lower end of the conveyer and is dumped on the conveyer from where it is brought over the top and dumped in a stack. The continuous operation of the conveyer is effected through the means described. For the purpose of supporting the pivoted conveyer in each form of the invention, I have provided a cable 70. The cable 70 is secured at one end to the upper end of the conveyer as shown at 71. The conveyer extends through pulleys 72 of the supporting frame and is secured to a drum 73 at the lower end of the frame. The drum 73 is operated by a crank 74 or any other suitable means. Any well known means may be employed for locking the drum 73 against rotation when it is desired to retain the conveyer at a desired position.

To prevent the conveyer frame from accidental rotation when in an elevated position, I have pivoted a locking arm 75 to the base 14 as indicated at 76. The upper portion of the arm is provided with a transverse slot 77 receiving a locking pin 78 carried by one side of the frame. When desired the locking arm may be thrown to an inoperative position.

In the form of my invention illustrated in Figs. 11 to 13 inclusive, I have dispensed with the frame supporting the conveyer and its frame and have provided a main frame 79 carrying a conveyer belt 80. As in the other forms of my invention, the upper end of the frame 79 is provided with a head 81 receiving a vertical pivot pin 82. The vertical pivot pin is connected to the cable 83 as in the other forms of my invention. The lower end of the main frame 79 is secured direct to the bearing and supporting pin 84 mounted in a base 85. The frame is adapted to be adjusted to the desired position on the pivot element 86 arranged in the bearing pin 84.

An operating shaft 87 extends through the frame for operating the conveyer belt 80 and is provided with a gear 88.

A plate 89 in the form of a quadrant is arranged on one side of the frame 79 inwardly of the gear 88, and is provided with an arcuate slot 90 receiving locking screws 91. The quadrant 39 carries a rigid bearing sleeve 92 receiving a shaft 93 having a drive belt 94. As illustrated in Fig. 12 the shaft 93 may be retained in a horizontal position by reason of the arcuate slot 90 providing an adjustable connection between the quadrant 39 and the frame. As in the form of my invention illustrated in Fig. 2, the belt 94 is adapted for connection with a suitable source of power.

While I have shown and described the preferred embodiment of my invention, it is understood that I may make such minor changes in arrangement and construction of parts, as will remain within the spirit of the invention and scope of the appended claims.

Having thus described my invention, what I claim is:—

1. A stacker comprising, a frame, a base therefor, a pivot pin mounted on said base and connected to said frame, said pivot pin being hinged intermediate the ends thereof, a swivel element connected to the upper end of said frame, supporting cables connected to said swivel element, a conveyer pivotally carried by said frame, and power transmitting means carried by said frame and said conveyer.

2. A stacker comprising, a frame, a conveyer pivoted adjacent its lower end to said frame, means connected to the upper end of said frame and the upper end of said conveyer for disposing said conveyer in an inclined position, and power transmitting means for said conveyer.

3. A stacker comprising, a frame, means to rotatably and pivotally support said frame, a conveyer pivoted adjacent its lower end to said frame, power transmitting means for said conveyer, and cable supports secured to the upper end of said frame.

4. A hay stacker including a frame, a conveyer belt carried thereby, a supporting pin for said frame, said supporting pin being composed of sections pivoted together, and a base for said supporting pin.

In testimony whereof I affix my signature in presence of two witnesses.

JOHN HABBART.

Witnesses:
A. B. CURRAN,
MATTHIAS R. MUNSON.